United States Patent [19]

Huret

[11] 4,235,118
[45] Nov. 25, 1980

[54] BICYCLE DERAILLEUR

[75] Inventor: Roger H. M. Huret, Nanterre, France

[73] Assignee: Etablissements Huret & Fils, Nanterre, France

[21] Appl. No.: 950,815

[22] Filed: Oct. 12, 1978

[30] Foreign Application Priority Data

Jun. 1, 1978 [FR] France ................. 78 16452

[51] Int. Cl.³ .............................. F16H 11/00
[52] U.S. Cl. ..................... 74/217 B; 403/91
[58] Field of Search ........... 74/217 B, 242.1 R, 242.8, 74/242.15 B, 242.15 R; 280/236, 238; 403/91

[56] References Cited

U.S. PATENT DOCUMENTS

| | | | |
|---|---|---|---|
| 3,364,763 | 1/1968 | Juy | 74/217 B |
| 3,854,753 | 12/1974 | Hautier | 280/236 |
| 3,973,447 | 8/1976 | Nagano | 74/242.15 B |
| 4,027,542 | 6/1977 | Nagano | 74/217 B |
| 4,051,738 | 10/1977 | Dian | 74/217 B |
| 4,061,048 | 12/1977 | Huret et al. | 74/242.15 B |

Primary Examiner—C. J. Husar
Assistant Examiner—Conrad Berman
Attorney, Agent, or Firm—Mason, Kolehmainen, Rathburn & Wyss

[57] ABSTRACT

This invention concerns a bicycle derailleur comprising a screw engaging in a nut which is provided on the derailleur and which comes into contact with a stop member which is fixed in relation to the bicycle frame.

3 Claims, 3 Drawing Figures

BICYCLE DERAILLEUR

The present invention relates to a derailleur for use on bicycles.

In order to ensure correct functioning of a bicycle derailleur in respect of speed to operation and precision of speed change, it is known that the length of the chain-side between the sprockets of the free-wheel on the rear wheel and the chain-guide pulley, must be as short as possible. This is obtained by adjusting the angular position of the derailleur around its mounting spindle, whereby the chain-guide pulley is placed at a short distance from the largest diameter sprocket of the free-wheel. The angular position of the derailleur is regulated by a screw engaged in a threaded bore in the derailleur, the extremity of which screw strikes against a stop member provided on the rear fork bracket of the bicycle which also receives the spindle of the rear wheel. Thus, by adjusting the screw in or out of its bore, the angular position of the derailleur may be adjusted in relation to its mounting on the bicycle frame.

Such an arrangement has, however, certain disadvantages. For example, the threaded bore or nut is located on a part which is integral with the derailleur, which complicates considerably the manufacture of the derailleur by casting or punching, and necessitates careful machining. Furthermore, since the nut is located on the derailleur and the stop member on the rear fork bracket, not every derailleur can be mounted on any bicycle. On the contrary, a derailleur must be selected, not in view of its technical advantages, but because of the position of this nut which must be adapted to the position of the stop member provided on the rear fork bracket. Such an arrangement is therefore unacceptable on a commercial scale.

In order to remedy this situation, the derailleur was previously secured to the rear fork bracket by means of a separate bracket which thus accommodated the pivotal axis of the derailleur and carried a stop member in a position suited to the angular position of the derailleur when in operation. This involved, however, the provision of an extra part, an increase in cost and in weight, and an increase in the distance between the derailleur pulleys and the axis of the free-wheel, with all the disadvantages which this brought to the construction of the derailleur itself.

The object of the present invention is to obviate these disadvantages. Thus, the invention relates to a derailleur for bicycles which comprises a screw engaging in a nut on the derailleur and which comes into contact with a stop member which is fixed with regard to the bicycle frame. Said derailleur being characterised in that the nut receiving the screw is located on a separate part provided with an orifice for securing it to the mounting spindle of the derailleur. Said separate part being further provided with at least one stop member co-operating with a spur provided on the derailleur.

According to a further chracteristic of the invention, the part provided with a mounting orifice, with a nut to receive an adjustor screw, and with a stop member, assumes the form of a washer provided externally with two prolongations, one of which forms the stop member and the other, in the form of a lug having a threaded bore to receive the adjustor screw.

According to yet a further characteristic of the invention, the spur of the derailleur is formed on a washer disposed around the mounting axis of the derailleur.

The invention is illustrated, by way of example, of a non-limitative character in the accompanying drawing, in which.

Figure 1:
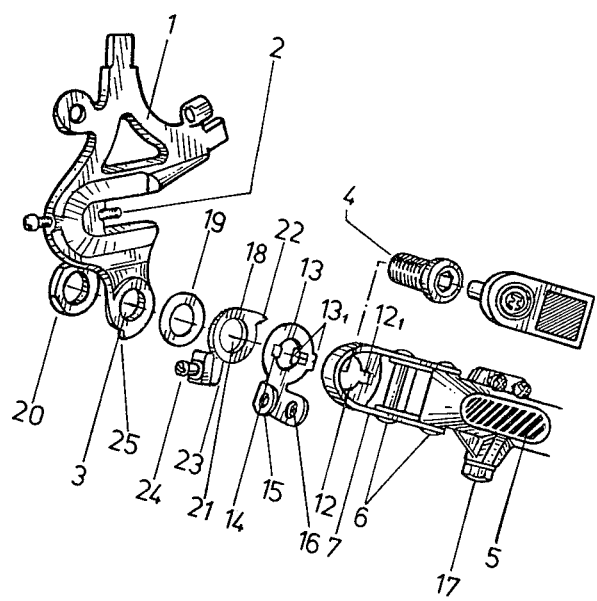
FIG. 1 is an exploded view of one embodiment of a device according to the invention.
Figure 2:
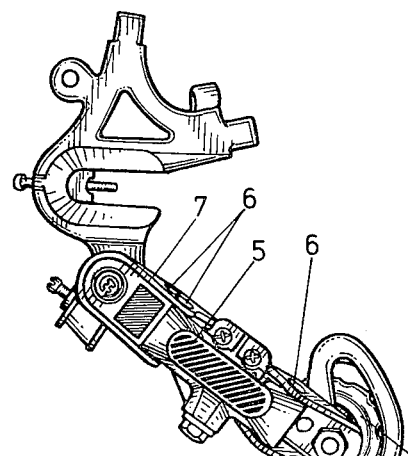
FIG. 2 is a general, perspective view of the device of FIG. 1.

The present invention relates to a derailleur which may be fitted to any bicycle, either directly to the rear fork bracket, where this bracket is provided with a stop, or to an intermediate support fixed in relation to the rear fork bracket. The adaptation being such that, in operation, the derailleur is in such an angular position that its chain-guide pulley occupies a position close to the largest sprocket of the free-wheel.

The present invention also relates to a manner of simplifying the manufacture of the derailleur and of enabling the device to be repaired should the nut receiving the adjustor screw be broken or damaged.

In the accompanying drawing, a derailleur is shown and also a bicycle rear fork bracket 1, of known construction, having a slot 2 to receive the rear wheel of the bicycle and a threaded hole 3 to receive the screw 4 which constitutes the mounting spindle of the derailleur proper.

The derailleur in this case is of parallelogram construction, comprising two arms 5 pivotally mounted by means of pins 6 on members 7 and 8 which form the two other sides of the parallelogram. The part 8 itself supports a chain-guide pulley 9 and a chain-tension pulley 10 by way of a chain-guide fork 11. The mounting spindle 4 of the derailleur passes through and is received in an orifice 12 in the part 7 of the derailleur, the spindle firstly receiving a washer 13 which is fixed in relation to the part 7 by means of small lugs 14 which engage in peripheral notches $12_1$ in the orifice 12. The washer 13 is also provided with an extension of U-shape with limbs 15, 16 carrying aligned orifices, whereby the derailleur control cable is inserted through the limb 16, whilst the limb 15 guides the sheath of the cable which is secured to one of the arms 5 by the screw 17.

In addition to the washer 13, the spindle accommodated in the orifice 12 receives the part 18 constructed in accordance with the invention, and then a friction washer 19. The spindle 4 is then engaged in the thread of the aperture 3 in the rear fork bracket 1 and is secured by a lock nut 20.

The manner of securing the mounting spindle 4 in the threaded aperture 3 is such that the derailleur is enabled to pivot freely around said spindle in order, in particular, to allow the derailleur to be withdrawn when the rear wheel of the bicycle is removed, which pivotal motion is restricted by means of a stop member in order to position the chain-guide pulley 9 as near as possible to the greatest diameter of the free-wheel of the bicycle. This angular position of the derailleur whilst in operation is determined by the part 18 in the form of a washer suitably provided with a central orifice 21 to receive the spindle 4. The washer 18 also carries two prolongations, one, 22, of which forms a stop member which comes into contact with a spur $13_1$ formed laterally on the washer 13 which, of course, is fixed in relation to the part 7 of the derailleur. The other prolongation of the washer 18 is a lug 23 carrying a threaded hole to receive the adjustor screw 24 which is intended to strike against the stop 25 on the rear fork bracket 1 whereby, as the screw 24 is adjusted in one or other direction, the washer 18 is pivoted, thus transmitting the pivotal motion to the derailleur by way of the spur $13_1$.

Thus, according to the invention, any type of derailleur can be adapted to any particular bicycle, irrespective of the position of the stop 25 on the rear fork bracket 1, since it is sufficient to employ a washer 18, the position of whose stop member 22 relative to the lug 23 is determined in relation to the position of the stop 25 and to the desired angular position of the derailleur. Moreover, should the lug 23, or the thread thereof, become unserviceable, the washer 18 may be speedily replaced without the necessity of replacing the derailleur. Indeed, the washer 18 is simple to manufacture and can be easily produced by stamping. The washer 18 is friction-mounted on the spindle 4 between the washers 13 and 19 and may likewise, according to the invention, comprise a plurality of stop members 22 in order to enable any type of derailleur to be mounted on a rear fork bracket, even if the stop 25 occupies a position which varies very considerably from one bicycle frame to the other.

Figure 3:
FIG 3 is a perspective view of a further embodiment of the independent part forming a stop member.

Such an arrangement is illustrated in FIG. 3 in which the washer 26, with central orifice 27 and threaded lug 28, is provided with two stop members $29_1$ and $29_2$ displaced substantially relative to each other through an angle of 90°. The washer 26 can be employed irrespective of the position of the stop 25 on the bracket 1 within the limits of an angle of 180° relative to the centre of the orifice 3.

In the case where the derailleur in question is to be mounted on a rear fork bracket with the aid of an intermediate bracket, the same advantages will be obtained by disposing the washer 18 or 26 around the spindle 4 between the derailleur and said intermediate bracket.

What is claimed is:

1. In combination, a bicycle derailleur adapted to be mounted on a spindle carried on a bicycle frame for rotative movement about a pivot axis of the spindle in relation to a stop surface in fixed relation to said axis on said bicycle frame, said derailleur including a separate element having an orifice for accommodating said mounting spindle of the derailleur extending therethrough and further including with at least one stop member for limiting the rotation of said derailleur relative to said fixed stop surface of said frame.

2. The derailleur combination according to claim 1, characterised in that said separate element includes a second stop member engaging a portion of said derailleur to limit the rotation thereof relative to said fixed stop surface.

3. The derailleur combination according to claim 1, characterised in that said one stop member includes screw means for adjusting the rotative position of said element on said spindle relative to said fixed stop surface.

* * * * *